US012621909B2

(12) United States Patent
Fursa et al.

(10) Patent No.: US 12,621,909 B2
(45) Date of Patent: May 5, 2026

(54) COIL FORMER, INDUCTIVE COMPONENT AND METHOD FOR ADJUSTING AN INDUCTANCE

(71) Applicant: Philip Morris Products S.A., Neuchatel (CH)

(72) Inventors: Oleg Fursa, Gempenach (CH); Jürgen Frey, Heidenheim (DE); Stefan Weber, Regensburg (DE)

(73) Assignee: Philip Morris Products S.A., Neuchatel (CH)

( * ) Notice: Subject to any disclaimer, the term of this patent is extended or adjusted under 35 U.S.C. 154(b) by 842 days.

(21) Appl. No.: 17/614,432

(22) PCT Filed: May 27, 2020

(86) PCT No.: PCT/EP2020/064724
§ 371 (c)(1),
(2) Date: Nov. 26, 2021

(87) PCT Pub. No.: WO2020/239847
PCT Pub. Date: Dec. 3, 2020

(65) Prior Publication Data

US 2022/0256661 A1 Aug. 11, 2022

(30) Foreign Application Priority Data

May 29, 2019 (DE) ..................... 10 2019 114 517.1

(51) Int. Cl.
*H05B 6/44* (2006.01)
*H05B 6/06* (2006.01)

(52) U.S. Cl.
CPC ................. *H05B 6/44* (2013.01); *H05B 6/06* (2013.01); *H05B 2206/022* (2013.01)

(58) Field of Classification Search
CPC .. H01F 17/045; H01F 2017/046; H01F 21/00; H01F 21/005; H01F 21/12;
(Continued)

(56) References Cited

U.S. PATENT DOCUMENTS 1,303,511 A 5/1919 Shackelton
5,220,304 A * 6/1993 Ho ........................ H01F 27/323
336/198

(Continued)

FOREIGN PATENT DOCUMENTS

CN 107820635 A 3/2018
DE 36 18 122 A1 12/1987

(Continued)

OTHER PUBLICATIONS

International Preliminary Report on Patentability Issued Dec. 2, 2021 in PCT/EP2020/064724 (submitting English translation only). 9 pages.

(Continued)

*Primary Examiner* — Vy T Nguyen
*Assistant Examiner* — Abigail H Rhue
(74) *Attorney, Agent, or Firm* — Oblon, McClelland, Maier & Neustadt, L.L.P.

(57) ABSTRACT

An inductive component is provided, including: a coil former including a base body and being a carrier for a winding wire; an electrically insulating foil, some regions of the body being wrapped with the foil; and a winding of the wire around the coil former, such that the foil is between the wire and the body, and extends over a maximum of two thirds of a maximum possible effective length of the foil with which the foil would be present underneath the entire winding such that in some regions the wire is disposed over the foil, and in some regions the wire is disposed directly on the body, and such that a diameter of the winding in a region
(Continued)

Figure 1:
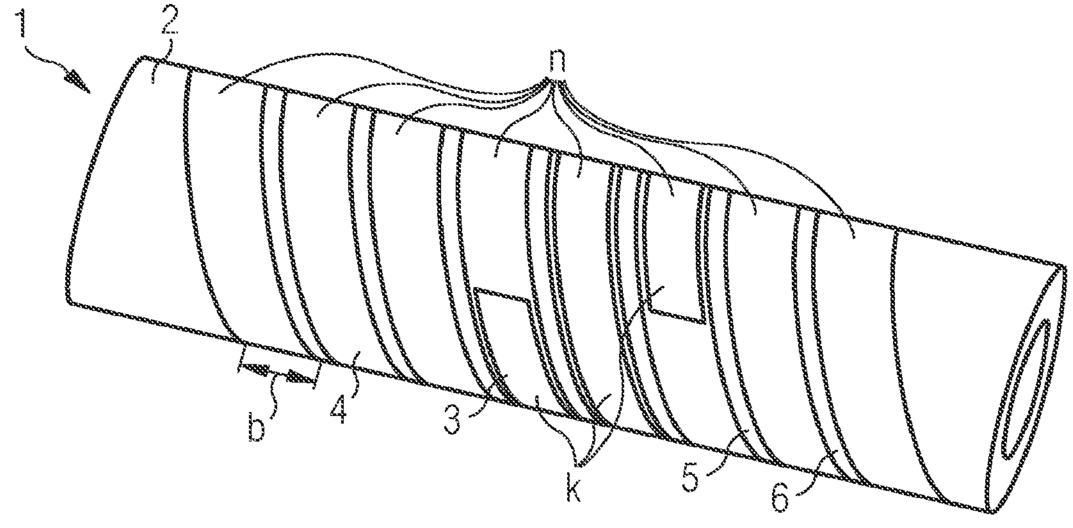

in which the wire is disposed over the foil is increased. A method for adjusting an inductance value for a group of inductive components of a same design is also provided.

14 Claims, 2 Drawing Sheets

(58) Field of Classification Search
CPC .... H01F 27/306; H01F 27/324; H01F 27/325; H01F 5/02; H05B 2206/022; H05B 6/06; H05B 6/44
USPC ........................... 174/186; 336/200; 219/600
See application file for complete search history.

(56) References Cited

U.S. PATENT DOCUMENTS

| | | | | |
|---|---|---|---|---|
| 5,504,469 | A | 4/1996 | McGrane | |
| 5,844,461 | A | 12/1998 | Faulk et al. | |
| 2003/0127244 | A1* | 7/2003 | Cho | H01F 27/2895 174/186 |
| 2003/0128092 | A1* | 7/2003 | Maguire | H01F 21/065 336/200 |
| 2004/0263307 | A1 | 12/2004 | Christopherson et al. | |
| 2010/0164497 | A1 | 7/2010 | Huber et al. | |
| 2013/0321113 | A1 | 12/2013 | Roy et al. | |
| 2019/0198214 | A1* | 6/2019 | Tsurusaki | H01F 27/2823 |

FOREIGN PATENT DOCUMENTS

| | | | |
|---|---|---|---|
| DE | 39 26 231 | A1 | 2/1991 |
| DE | 43 44 459 | A1 | 6/1994 |
| DE | 199 52 192 | A1 | 4/2001 |
| DE | 10 2008 063 312 | A1 | 7/2010 |
| EP | 0 461 712 | A1 | 12/1991 |
| JP | 7-240324 | A | 9/1995 |
| JP | 2002-93649 | A | 3/2002 |
| RU | 22 841 | U1 | 4/2002 |
| WO | WO 2018/079134 | A1 | 5/2018 |

OTHER PUBLICATIONS

Russian Search Report issued Aug. 23, 2023 in Russian Patent Application No. 2021138975/07 (With English Translation), 4 pages.
Korean Office Action issued May 14, 2024 in Korean Patent Application No. 10-2021-7041841 (with English Translation), 7 pages.
International Search Report issued on Jun. 22, 2020 in PCT/EP2020/064724 filed May 27, 2020, 2 pages.
German Search Report issued on Apr. 30, 2020 in German Patent Application No. 10 2019 114 517.1 filed May 29, 2019, 12 pages (with Translation of Categories).
Malaysian Office Action issued Oct. 21, 2024 in Malaysia Patent Application No. PI2021007079, 5 pages.
Japanese Office Action issued Aug. 1, 2024 in Japanese Patent Application No. 2021-570426 (with unedited computer-generated English Translation), 7 pages.
Combined Chinese Office Action and Search Report issued Jan. 18, 2025, in corresponding Chinese Patent Application No. 202080039163.4 (with English Translation), 14 pages.
Philippines Office Action issued Feb. 5, 2025, in corresponding Philippines Patent Application No. Jan. 2021/552861 (with English Translation), 7 pages.
Office Action issued May 20, 2025 in Brazilian Patent Application No. BR112021020784-8, with English translation.

* cited by examiner 1
2
M 3
l 1
2
3

7
1
8
9
D
M

COIL FORMER, INDUCTIVE COMPONENT AND METHOD FOR ADJUSTING AN INDUCTANCE

The present invention relates to a coil former for an inductive component and an inductive component comprising a coil former with a wire winding. This can be an air-core coil, i.e. a coil without a magnetic core. The inductive component is used in a stereo system, among other things.

For many applications, a precise adjustment of the inductance value of the component, at least on a statistical average for a group of inductances (lot), is desirable. Resonance applications in particular require a highly precise adjustment of the inductance.

The geometric dimensions strongly affect the inductance of electrical components, in particular in the case of air-core coils. Highly precise inductance values can only be produced within certain physical limits and require precise control of the geometry. For inductances with or without a ferrite core, variations in the material properties and the operating temperature lead to a variation of the inductance value as well. The correction of deviations of the inductance value of a finished component from a desired target value is referred to as “adjustment” or “tuning”.

Documents DE 36 18 122 A1, DE 39 26 231 A1, DE 199 52 192 A1 and DE 10 2008 063 312 A1 describe adjustable inductive components. An adjustment is usually accomplished by pushing a core of soft magnetic material into or out of the interior of the winding, or by pulling apart or compressing the winding.

It is an object of the present invention to provide an improved coil former, an improved inductive component and a method for adjusting an inductance of an inductive component.

According to a first aspect of the present invention, a coil former is configured as a carrier for a winding wire of an inductive component. The coil former comprises a base body, of which at least some regions are wrapped with an electrically insulating foil. The diameter of the coil former is selectively increased by the wrapping with the foil. The inductance can thus be adjusted in a targeted manner after a winding wire has been wound onto the coil former and over at least some regions of the foil.

In one embodiment, the base body of the coil former is made of a non-magnetic material. This can be a plastic material, for example. The inductive component can thus be configured as an air-core coil, i.e. not comprise a magnetic core around which the winding wire is wound. The coil former thus functions purely as a carrier for the winding wire and does not guide the magnetic flux. In such an embodiment, the inductance is particularly strongly dependent on the geometry, in particular the diameter of the coil, so that precise fine tuning by changing the diameter is possible.

For example, the thickness of the foil is significantly less than 1 mm. The maximum thickness of the foil is 100 μm, for example. The thickness of the foil can in particular be between 10 and 40 μm.

In an alternative embodiment, the base body can be made of a magnetic material. This can be a ferrite core, for example.

The foil is, for example, wrapped helically around the base body. The length of the foil and, if the geometry of the wrapping is fixed, thus also the number of turns of the foil around the base body can be defined as a function of a target value of the inductance. For example, the number of turns is varied between one turn and four turns.

The foil is in particular arranged in such a way that the winding of the winding wire can be disposed over the wrapping of the foil. The geometry of the wrapping of the foil in particular corresponds to the geometry of the winding of the wire, wherein the wrapping of the foil is preferably shorter than the winding of the wire. The wire winding can cover the entire length of the foil and extend beyond the foil. The winding wire can also cover the entire width of the foil.

In the following, the maximum possible effective length is the length of the foil with which the foil is present underneath the entire winding. The entire winding is thus applied over an enlarged diameter.

The foil is applied to half the possible maximum effective length in a first step, for example, then the winding is applied and the inductance of the component measured. The length of the foil is then reduced or increased for the production of further components as a function of the measured inductance value. The initial application of the foil over only part of the maximum possible length, for example over half, is intended to provide flexibility for fine tuning the length of the foil.

The foil in the resulting component does not extend over the entire length of the base body, for example, in particular not over the maximum possible, effective length of the foil. For example the foil extends over no more than two thirds of the length of the base body or the maximum possible, effective length. Or the foil extends over at least a third of the length of the base body or the maximum possible, effective length. It is also possible for the foil to extend over the entire maximum possible effective length at first or in the tuned component, or for there to be no foil.

As an alternative or in addition, it is optionally also possible to adjust the diameter, and thus inductance, by varying the thickness of the foil or the number of layers of the foil. The foil can be applied to the base body in one layer. To further change the thickness, however, the foil can also be applied in multiple layers. To adjust the inductance, a specific number of layers of the foil is initially present, for example, and then one or more layers are removed or added depending on the measured inductance value. The foils can also have different thicknesses and the thickness of the foil can be varied for fine tuning. For example, the foil always extends over the maximum effective length. Alternatively, a combination of changing the length and changing the number of layers or thickness of the foil is possible as well.

In one embodiment, the foil is made of a non-magnetic material. This can be a plastic material, for example. The foil can comprise the same material as the coil former. The foil thus only serves to increase the diameter of the coil former and not to guide the magnetic flux.

The coil former can comprise a recess in which the foil is disposed. The recess is configured for the exact placement of the foil and/or the exact placement of the winding wire.

The configuration of the recess is circumferential, for example. The recess in particular extends helically around the base body. The recess can only extend circumferentially around the base body in sections or extend circumferentially around the base body continuously. For example, the recess comprises at least two turns, in particular continuous turns. The recess extends at least over the entire length of the foil, for example. The recess is preferably configured not only for placing the foil, but also for placing the winding wire. The recess preferably extends over a majority of the length of the base body.

The recess comprises lateral limitations, so that the foil and/or the winding wire are guided in a slip-proof manner perpendicular to its progression in its primary direction of extension. The lateral limitations can be formed by the material of the base body. The recesses can in particular be formed directly during the production of the base body, for example in an injection molding process. It is also possible for there to only be one lateral limitation for positioning.

The foil is only slightly wider than the recess, for example. The foil can also have the same width as the recess, or be slightly wider than the recess. In this case, the foil can be fixed in the recess by clamping.

According to a further aspect of the present invention, an inductive component comprises the previously described coil former and a winding wire wound around the coil former. At least in some regions, in particular over a region of the length of the winding wire, the foil is disposed between the winding wire and the base body. Consequently at least some regions of the outer diameter of the coil former, and thus of the inner diameter of the winding, are increased. This results in an increase in the inductance of the component.

The winding wire is configured as a flat wire, for example. The winding wire may alternatively also be configured as a round wire. It can be a copper wire.

The inductance of the component is, for example, between 1 and 1000 nH. Depending on the design, by varying the length of the foil, it is possible to adjust the inductance in a range of up to 10% of the inductance in 0.1% steps, for example.

The winding wire preferably extends over the entire length of the foil and, for example, also beyond the length of the foil. The foil and the winding wire are in particular configured as two uniform windings positioned one over the other. The wound winding wire is preferably longer than the foil. The winding wire thus only covers a portion of the foil in the primary direction of extension of the foil. For example, the ends of the winding wire extend beyond the foil on both sides.

The winding wire preferably comprises more windings than the foil. The number of turns of the foil is at most two thirds of the number of turns of the winding wire, for example. For instance, the winding wire comprises eight turns and the foil comprises five turns. There is thus sufficient flexibility for fine tuning the inductance.

The diameter of the winding of the wire can consequently be different in different regions. The diameter is in particular larger at locations in which the winding wire is disposed over the foil.

According to one embodiment, the inductive component comprises a coil former with a recess, wherein at least some regions of the foil and the winding wire are disposed within the recess. The recess can in particular be configured as already described above for the coil former. The recess can in particular be helical and comprise at least two turns. The winding wire may be slightly narrower than the recess. The winding wire can also have the same width as the recess, or be slightly wider than the recess. In this case, the winding wire can be fixed in the recess by clamping.

The foil can alternatively also be glued to the base body. For example, the foil is self-adhesive. The foil can also be attached to the base body by means of an applied adhesive. The winding wire can likewise be glued to the base body. It is also possible to attach the foil to the winding wire first, for example by gluing it to the winding wire, and then to arrange and attach the winding wire on the base body together with the foil.

The winding wire and/or the foil can alternatively also be attached to the base body by hot caulking. In the process, after placing the foil and the winding wire in the recess, radially projecting areas of the limitations can be widened using pressure and heat, so that the foil and the winding wire are at least partially enclosed by the limitations in radial direction. Here, too, the foil can be attached by gluing first, and the winding wire can then be attached by hot caulking.

According to a further aspect of the present invention, a method for adjusting an inductance value of an inductive component is provided. In this case, at least some regions of a base body of a coil former are wrapped with a foil. The length of the foil is selected as a function of a target value of the inductance. With a fixed geometry, the length corresponds to a number of turns of the foil.

The coil former is then wrapped with a winding wire, so that the foil is disposed between the base body and the winding wire at least in some regions, in particular along a region of the winding wire. The coil former and the inductive component are, for example, configured as described above.

To adjust the length of the foil, the inductance of an inductive component of the same design is measured, for example. The inductance can also be measured indirectly, i.e. a different parameter that is a measure of the inductance. The length of the foil for a further inductive component can then be changed as a function of the deviation of the measured value from a target value.

The length is increased or reduced incrementally, for example, until the desired target value is reached. For example, the number of turns is changed in a range from 1.00 to 4.00 turns. The increment of length change is less than one turn for example, for example 0.01 turns.

According to a further aspect of the present invention, a coil former for an inductive component comprises a limitation for positioning a winding wire.

The limitation is in particular configured to guide a section of the winding wire in a central region of the winding; i.e., this is a section adjoined on both sides by at least one further turn of the winding wire. Consequently, this is not an edge section of the winding. The section is guided on both sides through two limitations, for example. The limitations thus form a recess for accommodating at least one section of a winding wire.

The limitation or recess extends in particular helically around a base body of the coil former. The limitation or recess comprises at least two turns, for example. The recess can be configured in a base body of the coil former. The recess can also be configured for positioning a foil as described above. The coil former can, however, also not comprise a foil. Otherwise, the coil former can be configured as described above.

According to a further aspect of the present invention, an inductive component comprises such a coil former with a recess, in which a winding wire is disposed. The winding wire is configured as a flat wire, for example. A foil can be disposed between the winding wire and a base body of the coil former. There can also be no such foil. The inductive component can otherwise be configured as described above. The winding wire is attached to the base body as described above, for example by clamping, gluing or hot caulking.

The description of the objects provided here is not restricted to the individual specific embodiments. Rather, the features of the individual embodiments can be combined with one another insofar as technically reasonable.

The objects described here are explained in more detail in the following on the basis of schematic design examples.

Figure 2:
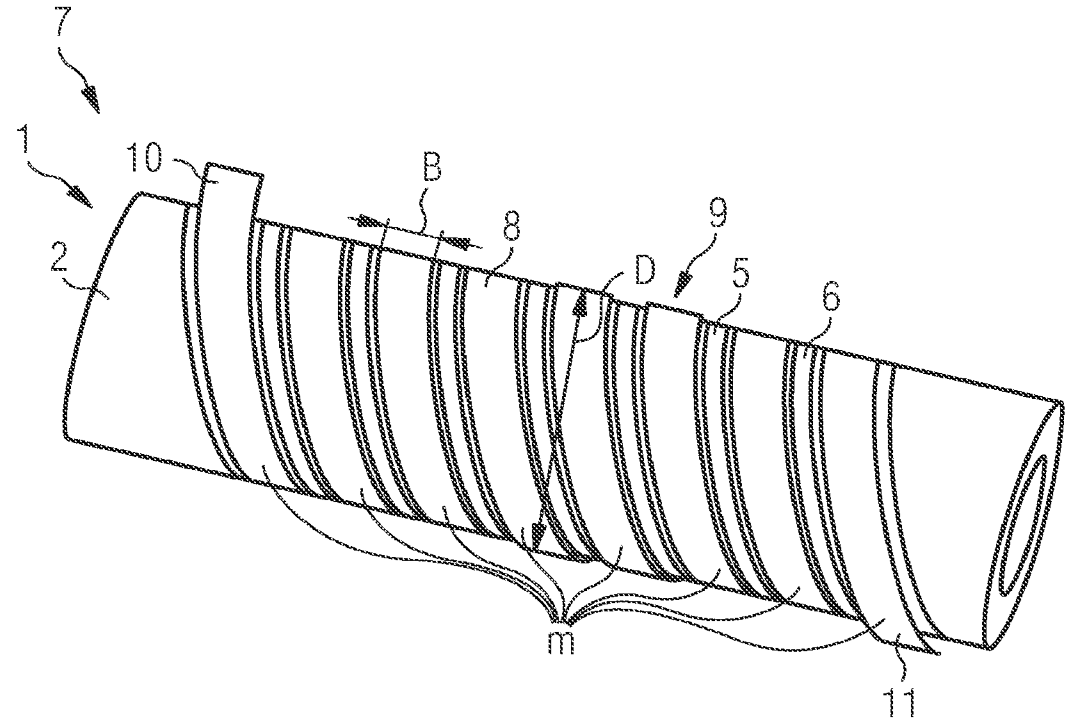

The figures show:

FIG. 1 an embodiment of a coil former in a lateral view,

FIG. 2 an embodiment of an inductive component in a lateral view,

FIGS. 3A to 3E a method for adjusting an inductance in a schematic illustration.

In the following figures, the same reference signs preferably refer to functionally or structurally equivalent parts of the various embodiments.

FIG. 1 shows a coil former 1 for an inductive component. The coil former 1 is configured as a carrier for a winding wire.

The coil former 1 is in particular configured for an air-core coil, i.e. a coil in which there is no magnetic core. The coil former 1 is non-magnetic. The coil former 1 may comprise a base body 2 made of plastic. The coil former 1 is produced in an injection molding process, for example. The inductance of an air-core coil is largely determined by the geometry of the winding.

In one alternative embodiment, the coil former 1 can also be configured as a magnetic core, for example as a ferrite core, or there may a magnetic core in the coil former 1.

The base body 2 in the present case has a cylindrical shape. The base body 2 can also have a different shape, for instance a cuboid shape. The base body 2 can also be a part of a larger body, for example an annular body. The base body 2 can be configured as a hollow body.

Some regions of the base body 2 are wrapped with a foil 3. The foil 3 serves to selectively increase the diameter of the base body 2.

The foil 3 is thin, which allows fine tuning of the diameter of the base body 2 and thus of the inductance of the component after a winding wire is wound over the foil 3. The foil 3 is between 10 μm and 40 μm thick, for example. For instance, the foil 3 is 25 μm thick. In the present case, the foil 3 is applied in one layer.

The foil 3 comprises a non-magnetic material. The foil 3 can comprise a plastic material or be made of a plastic material. The coil former 1 and the foil 3 can, for example, be made of the same material. In other embodiments, the foil 3 can comprise a magnetic material.

By selectively changing the length of the foil 3, corresponding to the number of turns k, the region with the increased diameter can be adjusted selectively, thus allowing the inductance of the resulting component to be tuned. In the present case, the foil 3 extends over k=2.00 turns. For example, the number of turns of the foil 3 is varied in a range of k=1.00 to 4.00 turns. The variation is carried out in increments of 0.01 turns, for example.

The coil former 1 furthermore comprises a recess 4, which is configured for the precise positioning of the foil 3 and/or the winding wire 8. The more precisely the foil 3 and/or the winding wire 8 can be positioned on the coil former 1, the more precisely the inductance of the component can be adjusted.

The recess 4 extends circumferentially around the base body 2. The recess 4 extends in particular helically around the base body 2 of the coil former 1. The recess 4 is delimited on both sides perpendicular to the circumferential direction by the limitations 5, 6. The limitations 5, 6 likewise extend around the base body 2. The recess 4 is thus configured as a circumferential guide groove/channel. In other words, the recess 4 is configured as a thread and the limitations 5, 6 are configured as thread flanks.

The foil 3 is placed into the recess 4. The width of the foil 3 is similar to that of the recess 4. The foil 3 may be slightly narrower than the recess 4. The foil 3 can also be the same width or slightly wider than the recess 4 and be fixed in the recess 4 by clamping or gluing.

The winding wire 8 (see FIG. 2) can also have a width similar to that of the recess 4. For instance, the width b of the recess 4 is at most 25% greater than the width B of the winding wire.

The recess 4 comprises n turns, whereby in the present case n=8. There can also be less or more than eight turns. The recess preferably comprises at least two turns.

In an alternative embodiment, the coil former 1 does not have a recess 4 for positioning the winding wire, but does have a foil 3.

In a further alternative embodiment, the coil former 1 does not have a foil for increasing the diameter, but does have a recess 4 for precisely positioning the winding wire.

FIG. 2 shows an inductive component 7 comprising a coil former 1 and a winding wire 8 wound around it, which thus forms a winding 9. The coil former 1 can be designed according to FIG. 1.

In the present case, the winding wire 8 is configured as a flat wire. The primary surface of the winding wire 8 rests on the base body 2 of coil former 1. The winding wire 8 can alternatively also be configured as a round wire. This is a copper wire, for example.

The winding wire 8 in the present case comprises m=7.50 turns. The maximum possible, effective length of the foil 3 is thus likewise 7.50 turns. The winding wire 8 can also have more or fewer turns.

The winding wire 8 comprises two ends 10, 11. The ends 10, 11 are continued on, for example to connect the component 7 to a contact terminal (not shown), or provided with a further contact connection (not shown).

Some regions of the winding wire 8 are disposed over the foil 3. The foil 3 is thus disposed between the base body 2 of the coil former 1 and the winding wire 8. In the region in which the winding wire 8 is disposed over the foil 3, the diameter of the winding 9 is increased. The winding wire 8 is thus disposed over the foil 3 in some regions, and directly on the base body 2 in some regions, depending on the length or number of turns k of the foil 3. The diameter D of the winding 9 is therefore increased only in some regions. The inductance of the component 7 is increased as a function of the size of the region with the increased diameter.

The winding wire 8 is disposed in the recess 4 for precise positioning. The width B of the winding wire 8 may be only slightly less than the width b of the recess 4. The position of the winding wire 8 is thus precisely determined by the recess 4. The width B of the winding wire 8 can also be slightly larger than the width b of the recess 2, so that the winding wire 8 is fixed between the limitations 5, 6 by clamping. The winding wire 8 can also be fixed in the recess 2 by hot caulking. Radial end regions of the limitations 5, 6 are in particular widened by hot caulking, so that the winding wire 8 is at least partially enclosed radially outward by the end regions.

In one embodiment, the inductive component 6 does not have recesses in the coil former 1 for positioning the winding wire 8, but does have a foil, as shown in FIG. 1.

In the present case, the winding wire 8 is wound onto the coil former 1 in one layer. In other embodiments, the winding wire 8 can also be wound onto the coil former 1 in multiple layers.

In an alternative embodiment, the inductive component 7 does not have a foil between the base body 2 and the winding wire 8, but does have the recess 4 for precisely positioning the winding wire 8. In this case, the diameter D of the winding 9 is uniform. Instead of a recess 4 with two limitations 5, 6, there can also only be one limitation 5, 6 for positioning on one side. The recess 4 or the limitation 5, 6 can furthermore also only be configured in sections.

FIGS. 3A to 3E show method steps for adjusting an inductance of an inductive component.

Figures 3A, 3B, 3C, 3D, 3E:
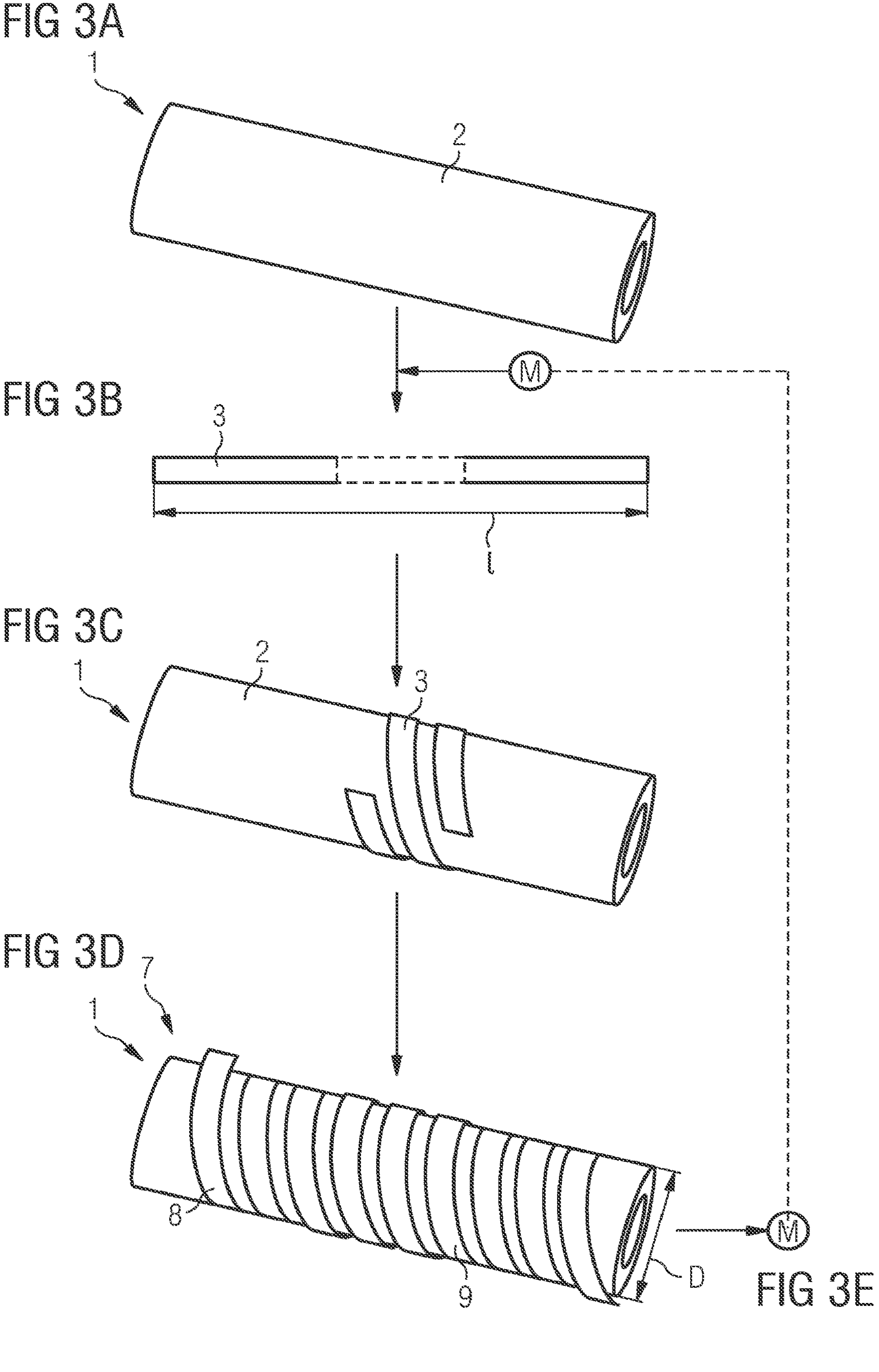

According to FIG. 3A, a coil former 1 is provided. The coil former 1 can be configured like the coil former 1 of FIG. 1. The coil former 1 can, but not does not have to, comprise the recess 4.

According to FIG. 3B, the length l of the foil 3 is defined, for example as a function of a target value, on the basis of an input measured value "M". The information can be obtained from a measurement of the inductance from an identical inductive component. If the measured inductance is smaller than a desired target value, a foil 3 with a greater length l than the measured component is selected. If the measured inductance is smaller than a desired target value, a foil 3 with a shorter length l than the measured component is selected.

The length l of the foil 3 corresponds to a number of turns k for a specified coil former 1 and a specified winding geometry. The number of turns k is varied in increments of 0.01 turns, for example. The number of turns is adjusted in the range from 1.00 to 4.00 turns, for example.

According to FIG. 3C, the foil 3 is wrapped around the base body 2. In the present case, the number of turns is set to approximately 2.05. The foil 3 can also be wrapped first and then cut to the desired length l. For precise positioning, the coil former 1 can comprise the helical recess 4 (see FIG. 1) and the foil 3 can be placed into the recess 4.

According to FIG. 3D, a winding wire 8 is wound around the coil former 1, so that a winding 9 is formed. The foil 3 selectively increases the diameter D of the winding 9, as shown here schematically. The diameter of the component 7 is changed as a function of the thickness of the foil 3, in particular in the μm range. The winding wire 8 in the present case is substantially longer than the foil 3. The winding wire 8 comprises at least one turn more than the foil 3. For instance, the number of turns of the winding wire 8 is at least one third greater than the number of turns k of the foil 3. This allows a large degree of freedom for adjusting the inductance.

According to FIG. 3E, a measured value M of the inductance is determined after the application of the winding 9. If the inductance is sufficiently close to the target value, the length l of the foil 3 is defined for a group of components. If the target value has not yet been reached, the length l of the foil 3 is changed further on the basis of the measured value M.

By adjusting the number of turns of the foil 3, a highly precise adjustment of the inductance of the component 7 can be achieved. For instance, depending on the design, the inductance can be adjusted very precisely in 0.1% increments in a range of up to 10%. The target value of the inductance is between 1 and 1000 nH, for example.

LIST OF REFERENCE SIGNS

1 Coil former
2 Base body
3 Foil
4 Recess
5 Limitation
6 Limitation
7 Inductive component
8 Winding wire
9 Winding
10 End of the winding wire
11 End of the winding wire
b Width of the recess
B Width of the winding wire
k Number of turns of the foil
n Number of turns of the recess
m Number of turns of the winding wire
D Diameter of the winding
M Measured value

The invention claimed is:

1. An inductive component, comprising:

a coil former comprising a base body and being configured as a carrier for a winding wire;

an electrically insulating foil, wherein some regions of the base body are wrapped with the electrically insulating foil; and a winding of the winding wire, which is wound around the coil former, such that the electrically insulating foil is entirely disposed between the winding wire and the base body, wherein the electrically insulating foil extends over a maximum of two thirds of a maximum possible effective length of the electrically insulating foil, wherein the maximum possible effective length of the electrically insulating foil is the length of the electrically insulating foil with which the electrically insulating foil is present underneath the entire winding, with which the electrically insulating foil would be present underneath the entire winding such that in some regions the winding wire is disposed over the electrically insulating foil, and in some regions the winding wire is disposed directly on the base body, and such that a diameter of the winding in a region in which the winding wire is disposed over the electrically insulating foil is increased compared to a diameter of the winding where the winding wire is disposed directly on the base body.

2. The inductive component according to claim 1, wherein the base body is made of a non-magnetic material.

3. The inductive component according to claim 1, wherein the electrically insulating foil is made of a non-magnetic material.

4. The inductive component according to claim 1, wherein the electrically insulating foil has a maximum thickness of 100 μm.

5. The inductive component according to claim 1, wherein the coil former further comprises a recess, and wherein the electrically insulating foil is disposed in the recess.

6. The inductive component according to claim 5, wherein the recess is helical and comprises at least two turns.

7. The inductive component according to claim 5, wherein the winding wire is disposed in the recess.

8. The inductive component according to claim 1, wherein the electrically insulating foil is wrapped helically around the base body, and wherein a number of turns (k) of the electrically insulating foil is at most two thirds of a number of turns (m) of the winding wire.

9. The inductive component according to claim 1, wherein an outermost diameter of the winding wire is greater than an outermost diameter of the electrically insulating foil that the winding wire is wound around.

10. The inductive component according to claim 1, wherein the electrically insulating foil extends over at least one third of the maximum possible effective length.

11. The inductive component according to claim 1, wherein a thickness of the electrically insulating foil is varied along a length of the electrically insulating foil.

12. The inductive component according to claim 1, wherein a number of layers of the electrically insulating foil is varied along a length of the electrically insulating foil.

13. A method for adjusting an inductance value for a group of inductive components of a same design, the method comprising:

wrapping at least some regions of a base body of a coil former with an electrically insulating foil, wherein a length of the electrically insulating foil is selected as a function of a target value of the inductance value;

after the wrapping of the at least some regions of the base body of the coil former with the electrically insulating foil is complete, wrapping the coil former with a winding wire, such that the electrically insulating foil is entirely disposed at least in some regions between the winding wire and the base body;

measuring an inductance of the inductive components after the wrapping with the winding wire; and either:

changing a length of the electrically insulating foil for a further inductive component as a function of a deviation of a measured value from a target value, if the target value has not yet been reached, or selecting a foil with a greater length than the measured inductive components for the further inductive component, if the measured inductance is smaller than a desired target value, or selecting a foil with a shorter length than the measured inductive components, if the measured inductance is larger than a desired target value, or defining a length of the foil for the group of inductive components, if the target value is reached;

wherein the electrically insulating foil extends over a maximum of two thirds of a maximum possible effective length of the electrically insulating foil, wherein the maximum possible effective length of the electrically insulating foil is the length of the electrically insulating foil with which the electrically insulating foil is present underneath the entire winding, with which the electrically insulating foil would be present underneath the entire winding such that in some regions the winding wire is disposed over the electrically insulating foil, and in some regions the winding wire is disposed directly on the base body, and such that a diameter of the winding in a region in which the winding wire is disposed over the electrically insulating foil is increased compared to a diameter of the winding where the winding wire is disposed directly on the base body.

14. The method according to claim 13, wherein the electrically insulating foil is wrapped helically around the base body, and wherein the changing the length of the electrically insulating foil for the further inductive component includes varying the length in steps smaller than one turn of the electrically insulating foil around the coil former.

* * * * *